A. A. McMAHEN.
PLOW.
No. 21,975.
Patented Nov. 2, 1858.
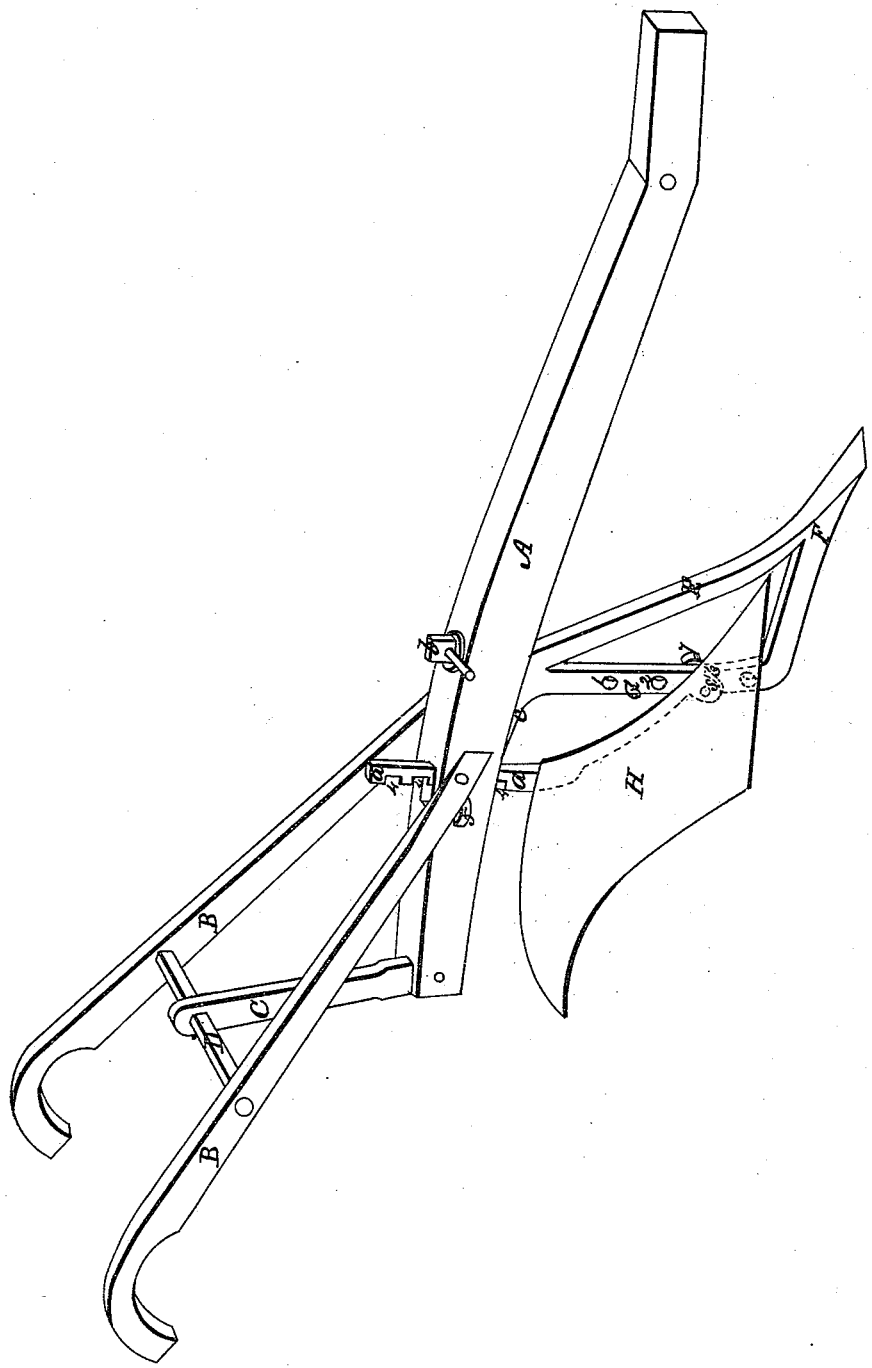

UNITED STATES PATENT OFFICE.

A. A. McMAHEN, OF OXFORD, MISSISSIPPI.

IMPROVEMENT IN PLOWS.

Specification forming part of Letters Patent No. 21,975, dated November 2, 1858.

*To all whom it may concern:*

Be it known that I ALLEN ALBERT MC-MAHEN, of Oxford, in the county of La Fayette and State of Mississippi, have invented a new and useful Improvement in Subsoil-Plows; and I do hereby declare the following to be a full, clear, and exact description of the construction and operation thereof, reference being had to the accompanying drawing, making a part thereof, and which represents a perspective view of the plow complete.

To enable others skilled in the art to make and use my invention, I will proceed to describe the same with reference to the drawings.

A represents the beam of the plow, to which the handles B B are attached, said handles being further supported by a brace, C, extending from the rear of the beam up to and having the rung D passed through its upper end.

E is the colter of the plow, which has a shoe-piece, F, at its bottom and extending backward, where it is united with a brace, G, that extends up to and is united with the top of the colter where it is let into the beam, the three pieces E F G forming a triangle.

In the upright piece or brace G there is a series of holes, 1 2 3, for adjusting and holding when adjusted the mold-board H. The mold-board H has a shank, *a*, which passes up through the beam A, and this shank is furnished with a series of notches, 4, so that a key, 5, passed through the beam horizontally, shall also pass through one of said notches, and thus hold the mold-board firmly at its adjusted point.

On the under side of the mold-board there is a lug or dead-eye, 6, through which, and through one of the holes in the brace G, a bolt, 7, passes to hold the mold-board to the colter. Thus the mold-board may be set up or down to suit the depth of plowing that is to be done for the time being.

*b* is the shank of the colter, that passes through the beam, and *c* a portion thereof that is let into the under side of the beam to properly support the colter as it in turn supports the mold-board. The shank *a* of the mold-board extends down along the edge of said mold-board and underneath it, and serves as a rib to strengthen said mold-board, being welded or otherwise fastened to it, and running out near the point thereof.

Having thus fully described the construction of my plow, what I claim therein as new, and desire to secure by Letters Patent, is—

In combination with a colter having a brace and adjusting-openings therein, a mold-board whose shank is made adjustable in the beam, so that said mold-board may be adjusted to the colter and in the beam, as herein described, the whole being combined and arranged in the manner and for the purpose set forth.

A. A. McMAHEN.

Witnesses:
A. B. STOUGHTON,
THOS. H. UPPERMAN.